US011919432B2

(12) United States Patent
Broizat

(10) Patent No.: US 11,919,432 B2
(45) Date of Patent: Mar. 5, 2024

(54) TRAILER UNIT FOR TRANSPORTING TRACKED CONSTRUCTIONAL MACHINES

(71) Applicant: VOLVO CONSTRUCTION EQUIPMENT AB, Eskilstuna (SE)

(72) Inventor: Frederic Broizat, Chezeneuve (FR)

(73) Assignee: Volvo Construction Equipment AB, Eskilstuna (SE)

( * ) Notice: Subject to any disclaimer, the term of this patent is extended or adjusted under 35 U.S.C. 154(b) by 615 days.

(21) Appl. No.: 17/253,817

(22) PCT Filed: Jun. 18, 2018

(86) PCT No.: PCT/EP2018/066140
§ 371 (c)(1),
(2) Date: Dec. 18, 2020

(87) PCT Pub. No.: WO2019/242836
PCT Pub. Date: Dec. 26, 2019

(65) Prior Publication Data
US 2021/0206308 A1 Jul. 8, 2021

(51) Int. Cl.
*B60P 3/06* (2006.01)
*B60D 1/52* (2006.01)
(Continued)

(52) U.S. Cl.
CPC ............... *B60P 3/062* (2013.01); *B60D 1/52* (2013.01); *B62D 25/168* (2013.01); *B62D 55/06* (2013.01);
(Continued)

(58) Field of Classification Search
CPC ......... B60P 3/062; B60D 1/52; B62D 63/068; E02F 9/003
(Continued)

(56) References Cited

U.S. PATENT DOCUMENTS 3,333,718 A * 8/1967 Durham ................. B60D 1/167
414/715
3,612,566 A * 10/1971 Sholl ....................... B60P 3/062
280/47.32
(Continued)

FOREIGN PATENT DOCUMENTS

AU 2009213134 A1 * 4/2010 ............. B60D 1/485
EP 3109069 A1 12/2016
(Continued)

OTHER PUBLICATIONS

International Search Report and Written Opinion of the International Searching Authority, PCT/EP2018/066140, dated Mar. 4, 2019, 10 pages.

*Primary Examiner* — Hilary L Gutman
(74) *Attorney, Agent, or Firm* — Sage Patent Group

(57) ABSTRACT

The invention concerns a trailer unit for use with a towing vehicle for transporting tracked constructional machines, such as excavators, said trailer unit including: a pair of wheeled carriages, respectively a left and a right wheeled carriages, adapted to be detachably connected to a pair of track frames, respectively a left and a right track frames, of a tracked constructional machine through first connecting means; a drawbar having a first end adapted to be detachably connected to a rear frame of the towing vehicle and a second end adapted to be detachably connected to a bottom frame of the tracked constructional machine through second connecting means.

11 Claims, 5 Drawing Sheets

(51) Int. Cl.
*B62D 25/16* (2006.01)
*B62D 55/06* (2006.01)
*B62D 63/06* (2006.01)
*E02F 3/815* (2006.01)
*E02F 9/00* (2006.01)
*E02F 9/02* (2006.01)

(52) U.S. Cl.
CPC ............ *B62D 63/068* (2013.01); *E02F 3/815* (2013.01); *E02F 9/003* (2013.01); *E02F 9/02* (2013.01)

(58) Field of Classification Search
USPC ............................................................ 410/2
See application file for complete search history.

(56) References Cited

U.S. PATENT DOCUMENTS

| | | | | |
|---|---|---|---|---|
| 4,081,090 A | * | 3/1978 | Hopkins | E02F 9/003 |
| | | | | 414/373 |
| 5,348,333 A | * | 9/1994 | Gee | B60D 1/143 |
| | | | | 280/491.1 |
| 5,601,303 A | * | 2/1997 | Underwood | B60P 1/027 |
| | | | | 280/475 |
| 5,725,233 A | * | 3/1998 | Gee | B60D 1/52 |
| | | | | 280/495 |
| 8,882,419 B2 | * | 11/2014 | Aguirre | B60P 7/0807 |
| | | | | 410/121 |
| 2008/0157504 A1 | * | 7/2008 | Schuettenberg | B60D 1/488 |
| | | | | 280/402 |
| 2009/0243383 A1 | | 10/2009 | Stubbs | |

FOREIGN PATENT DOCUMENTS

| | | | | | |
|---|---|---|---|---|---|
| GB | 2521252 A | * | 6/2015 | | B60P 3/062 |
| GB | 2530820 A | * | 4/2016 | | B60P 1/435 |
| GB | 2530820 A | | 4/2016 | | |
| GB | 2596083 A | * | 12/2021 | | B60D 1/52 |
| WO | WO 9847747 A1 | | 10/1998 | | |
| WO | WO-2013124543 A1 | * | 8/2013 | | B60P 3/06 |
| WO | WO-2016092152 A1 | * | 6/2016 | | B60P 3/062 |

\* cited by examiner

TRAILER UNIT FOR TRANSPORTING TRACKED CONSTRUCTIONAL MACHINES

CROSS REFERENCE TO RELATED APPLICATIONS

This application is a 35 U.S.C. § 371 national stage application of PCT International Application No. PCT/EP2018/066140 filed on Jun. 18, 2018, the disclosure and content of which is incorporated by reference herein in its entirety.

TECHNICAL FILED

The invention relates to a trailer unit for use with a towing vehicle for transporting tracked constructional machines.

The invention can be applied to several constructional machines, such as excavators or mini excavators.

BACKGROUND

The transport of tracked constructional machines, in particular excavators or mini excavators, is generally problematic. Indeed, the tracks of such machines do not permit their displacement from one site to another site. It is thus necessary to use a trailer. However, if the combined weight of the towing vehicle, the excavator and the trailer exceeds 4.25 tons, the road regulations impose that the driver of the towing vehicle has a specific driving license. Furthermore, the towing vehicle must be sufficiently big to lodge other equipment of the tracked constructional machines, such as buckets. The only possibility is thus to purchase or rent a dump truck or a large utility vehicle to tow the excavator. These constraints limit the number of people who wish to rent a mini excavator for their own needs.

The present invention aims to overcome the disadvantages of the prior art by providing a trailer unit that allows towing tracked constructional machines without requiring an additional qualification for the user or the use of a towing vehicle whose purchase or rental is relatively high.

SUMMARY

The invention concerns a trailer unit for use with a towing vehicle for transporting tracked constructional machines, such as excavators, said trailer unit comprising:
  a pair of wheeled carriages, respectively a left and a right wheeled carriages, adapted to be detachably connected to a pair of track frames, respectively a left and a right track frames, of a tracked constructional machine through first connecting means;
  a drawbar having a first end adapted to be detachably connected to a rear frame of the towing vehicle and a second end adapted to be detachably connected to a bottom frame of the tracked constructional machine through second connecting means;
wherein the first connecting means comprise a left, respectively a right, locking plate pivotally connected to the left, respectively the right, wheeled carriage, said left, respectively said right, locking plate being movable between an unlocking position, in which it can go through an aperture formed in the left, respectively the right, track frame, and a locking position, in which it cannot go through said aperture.

Thus configured, the trailer unit of the present invention allows converting a constructional machine into a trailer with a minimum weight increase and with a minimum of assembly steps.

The trailer unit may also include one or more of the following features, taken alone or in combination.

According to one embodiment, the left, respectively the right, locking plate has a rectangular or substantially rectangular shape.

According to a further embodiment, the left, respectively the right, locking plate is fixedly connected to a pivot axle, said left, respectively said right, locking plate moving from its unlocking position to its locking position, or vice-versa, when a lever integral with the pivot axle is moved along a rear-to-front direction.

According to a further embodiment, the first connecting means comprise a pair of hook-shaped elements adapted to hook a pair of protruding studs of the left, respectively the right, track frame when the left, respectively the right, wheeled carriage is attached to the left, respectively the right, track frame.

According to a further embodiment, each wheeled carriage comprises a pair of wheels, the wheels being aligned in a rear-to-front direction.

According to a further embodiment, each wheeled carriage comprises a mudguard extending above the wheels.

According to a further embodiment, the second connecting means comprise a pin adapted to be received in through-holes of the drawbar and corresponding trough-holes of the bottom frame of the tracked constructional machine when the drawbar is attached to said bottom frame.

According to a further embodiment, the second connecting means comprise locking circlips connected at both ends of the pin, said locking circlips preventing the disconnection of the drawbar from the bottom frame.

According to a further embodiment, the drawbar is adapted to be received in a central opening of a dozer blade of the tracked constructional machine when the drawbar is attached to the bottom frame.

The invention also concerns a tracked constructional machine equipped with a trailer unit according to the invention and comprising a pair of track frames, respectively a left and a right track frames, each track frame being provided with an aperture and a pair of protruding studs.

According to one embodiment, the tracked constructional machine further comprises a dozer blade provided with a central opening receiving the second end of the drawbar.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings:

FIG. 6 is is a top view of the detail illustrated in FIG. 5a;

DETAILED DESCRIPTION OF EXAMPLE EMBODIMENTS OF THE INVENTION

Figure 1:
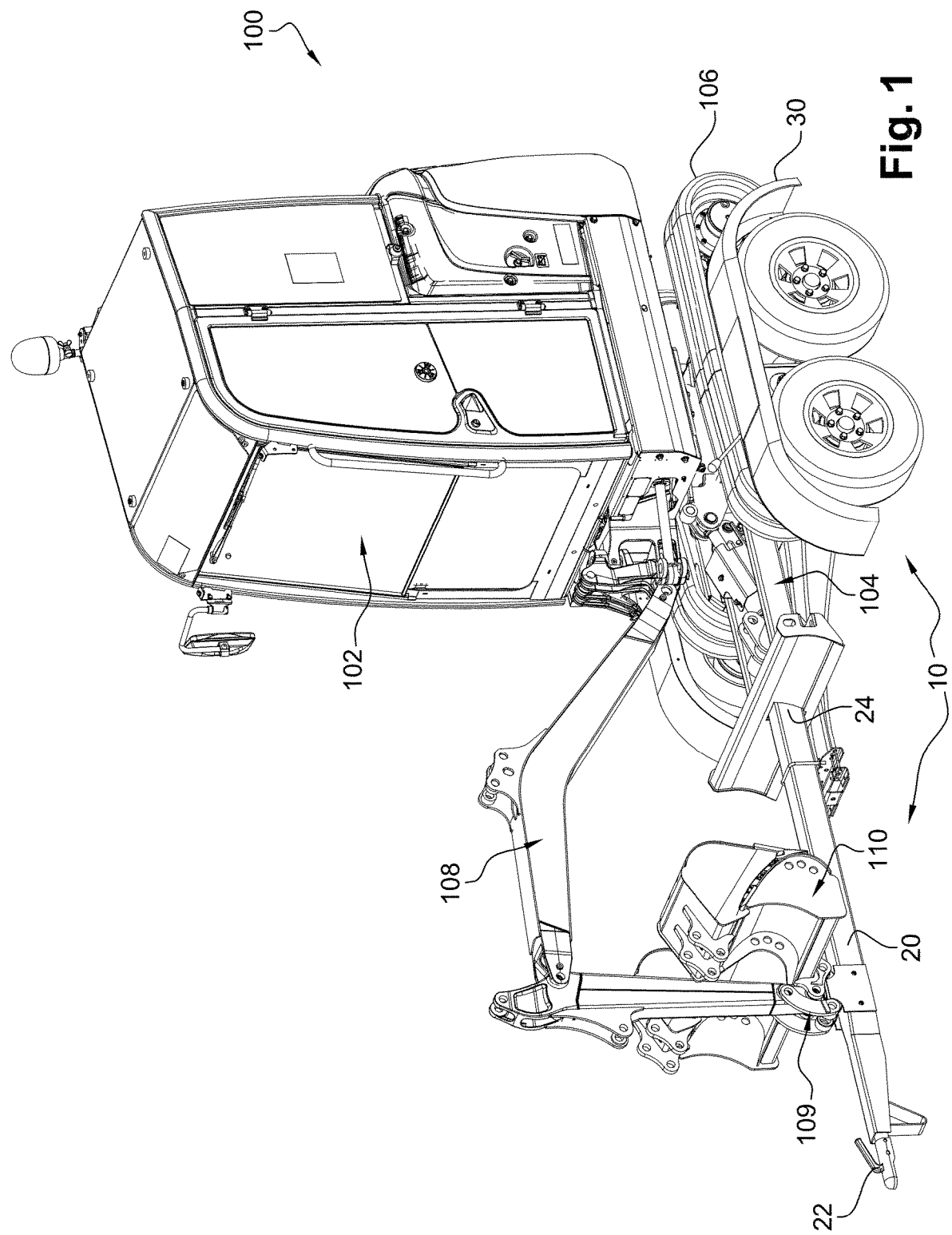
FIG. 1 is a perspective view of an excavator equipped with a trailer unit according to the invention.

The following description is merely exemplary in nature and is not intended to limit the present disclosure, application, or uses. It should be understood that throughout the drawings, corresponding reference numerals indicate like or corresponding parts or features.

FIG. 1 shows an excavator 100 equipped with a trailer unit 10 according to the invention. In the following paragraphs, the term "front" means "toward a front end of the excavator" and the term "rear" means "toward a rear end of the excavator". The term "internal" means "toward the gravity center of the excavator" and the term "external" means "away from the gravity center of the excavator". The trailer unit 10 comprises three independent elements, respectively a drawbar 20 and a pair of wheeled carriages 30. The drawbar 20 may advantageously comprise a front end 22 and a rear end 24, the front end 22 being adapted to be detachably connected to a towing vehicle (not shown) and the rear end 24 being adapted to be detachably connected to the excavator 100. The excavator 100 comprises a cockpit 102 rotatably connected to a bottom frame 104, a pair of tracks 106 at its lateral sides and an articulated arm 108 at its front side. The articulated arm 108 supports at least one tool 110, in particular a bucket, at its front end 109, said front end 109 being advantageously attached to the drawbar 20 when the excavator 100 is towed by a towing vehicle.

Figure 2:
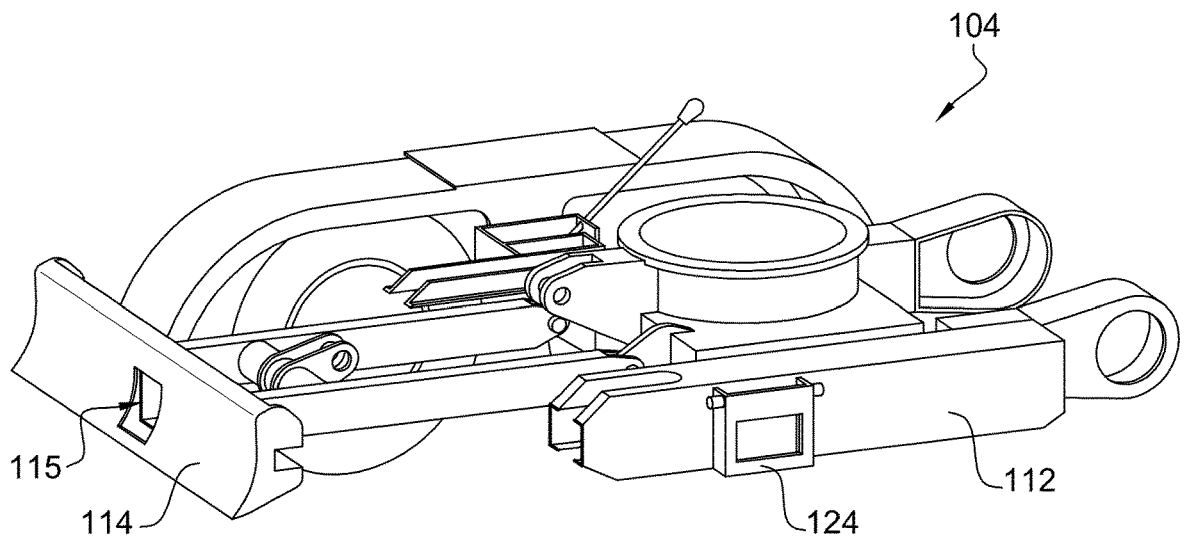
FIG. 2 is a perspective view of the bottom frame of the excavator illustrated in FIG. 1, equipped at one side with a wheeled carriage.
Figure 9:
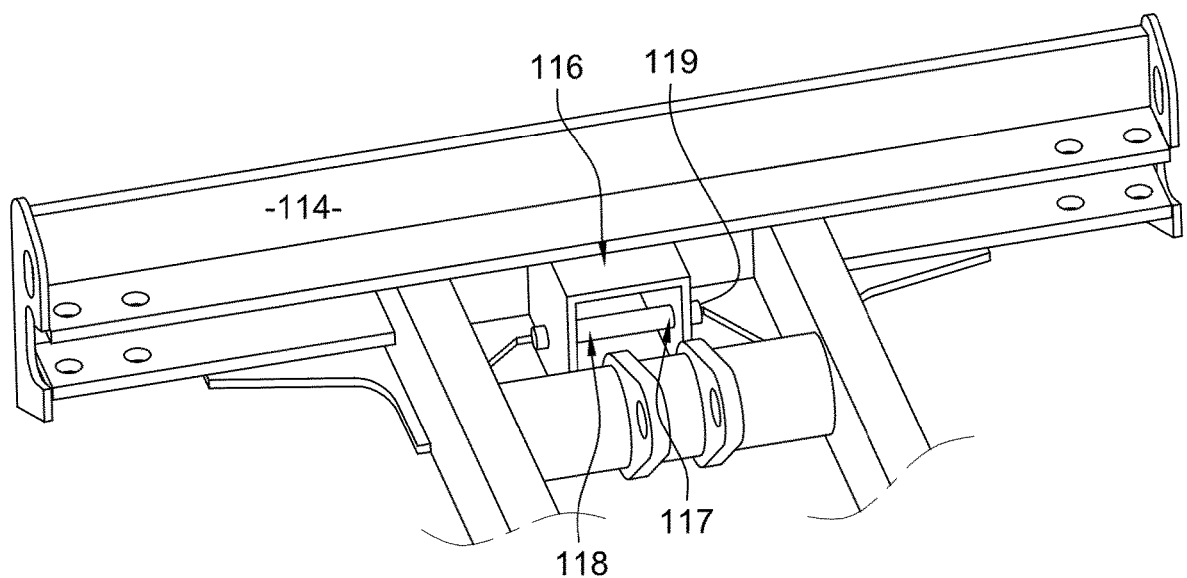
FIG. 9 is a rear perspective view of a dozer blade provided at the front side of the bottom frame illustrated in FIG. 2.
Figure 10:
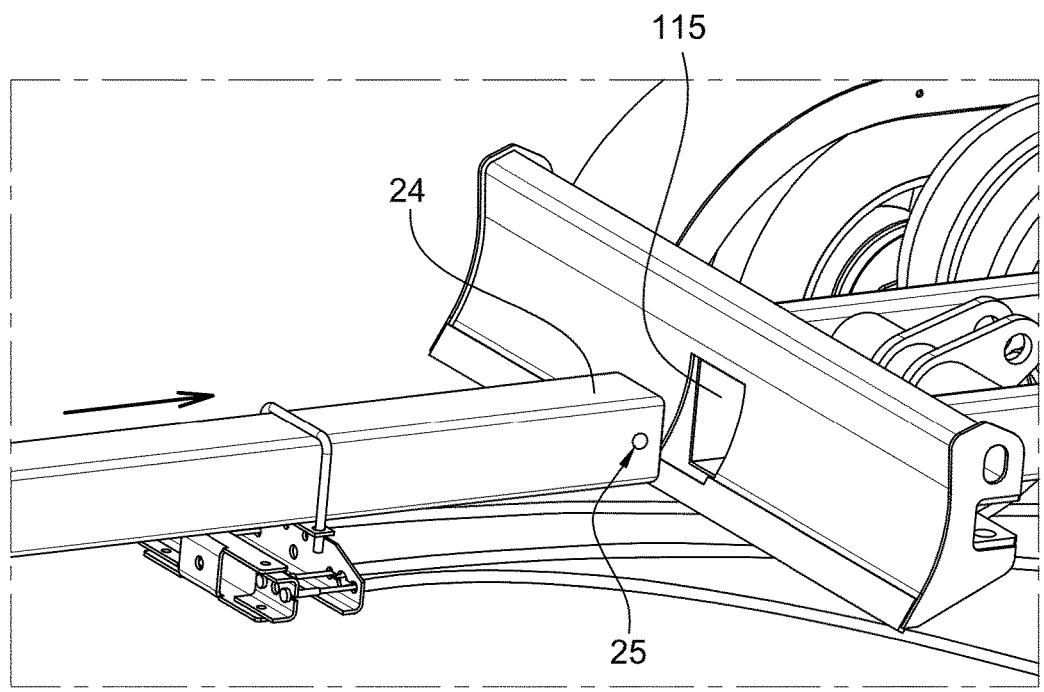
FIG. 10 is a perspective view of the dozer blade illustrated in FIG. 9, just before the attachment of the drawbar.
Figure 11:
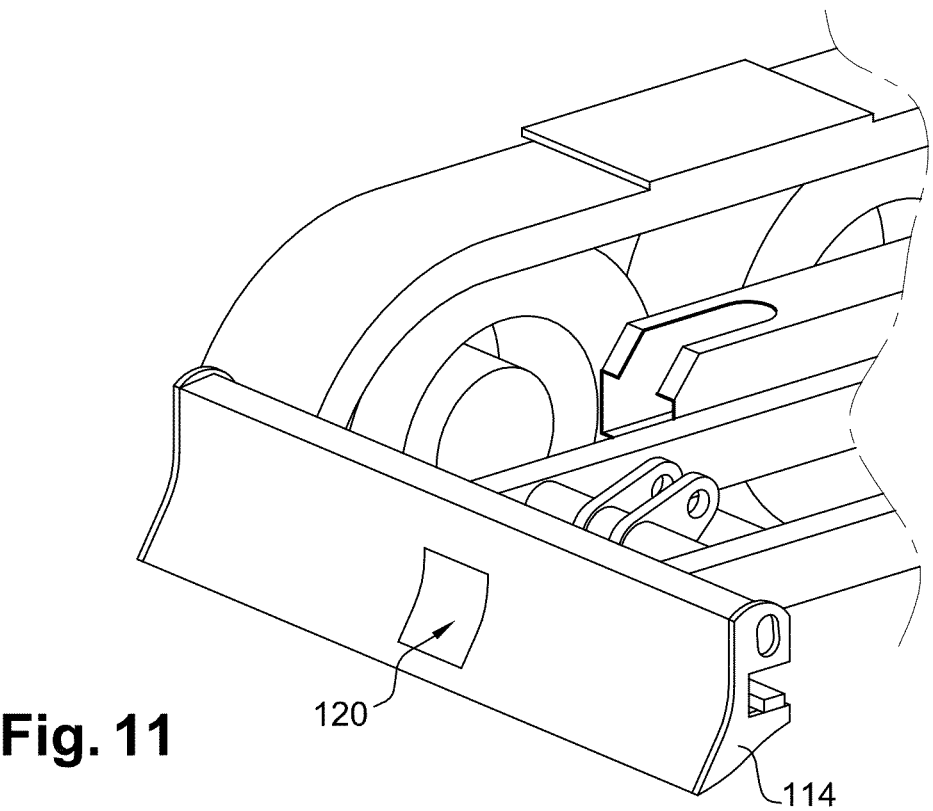
FIG. 11 is a front perspective view of the dozer blade illustrated in FIG. 9, when the excavator is not towed.
Figure 12:
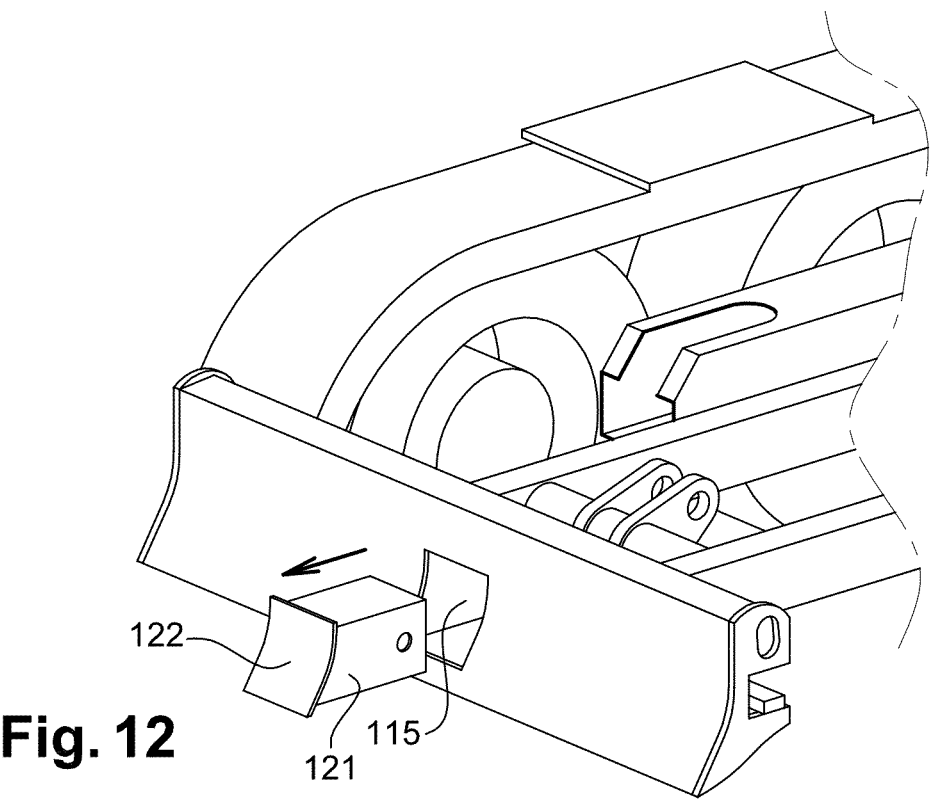
FIG. 12 is a view similar to FIG. 11, when the excavator is prepared to be towed.

As illustrated in FIG. 2, the bottom frame 104 comprises a pair of track frames 112 that support the tracks 106 and a dozer blade 114 at its front side. The dozer blade 114 may advantageously be pivotally movable about a horizontal axis. The dozer blade 114 is provided with a central opening 115, said central opening 115 being configured to receive the rear end 24 of the drawbar 20 when the drawbar is connected to the excavator 100, as illustrated in FIGS. 1 and 10. As illustrated in FIGS. 9 and 10, the drawbar 20 can be attached to the bottom frame 104 when a pair of through-holes 25 provided in the rear end 24 of the drawbar 20 is aligned with corresponding through-holes 117 provided in a U-shape attachment member 116 that extends rearward from the dozer blade 114 and when a pin 118 is received in said through holes 25 and said corresponding through-holes 117. A pair of locking circlips 119 may advantageously be connected at both ends of the pin 118 to prevent disconnection of the drawbar 20 from the attachment member 116. When the excavator 100 is not towed, the central opening 115 may advantageously be covered by a masking element 120 formed by a tubular profile 121 adapted to be detachably connected to the attachment structure 116 via the pin 118 and the circlips 119, and by a front end 122 having substantially the same dimension as the central opening 115, as illustrated in FIGS. 11 and 12.

Figure 3:
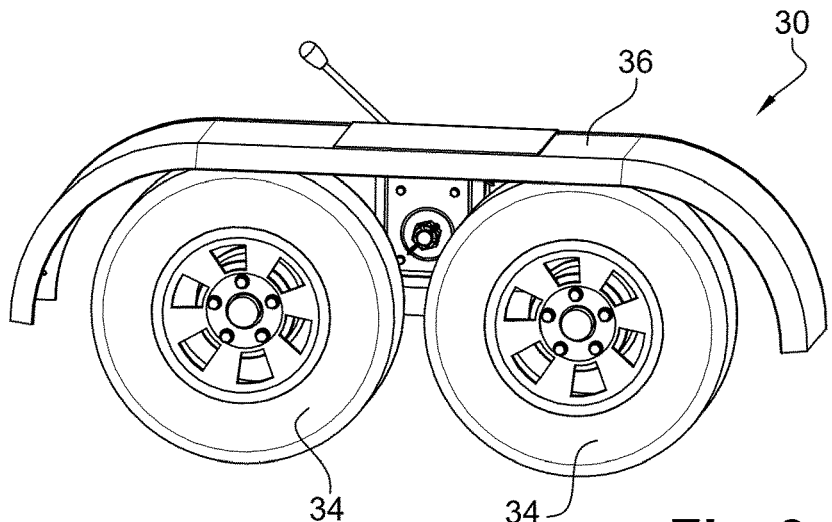
FIGS. 3 and 4 are perspective views of a wheeled carriage, when seen from the external and internal sides respectively.
Figure 4:
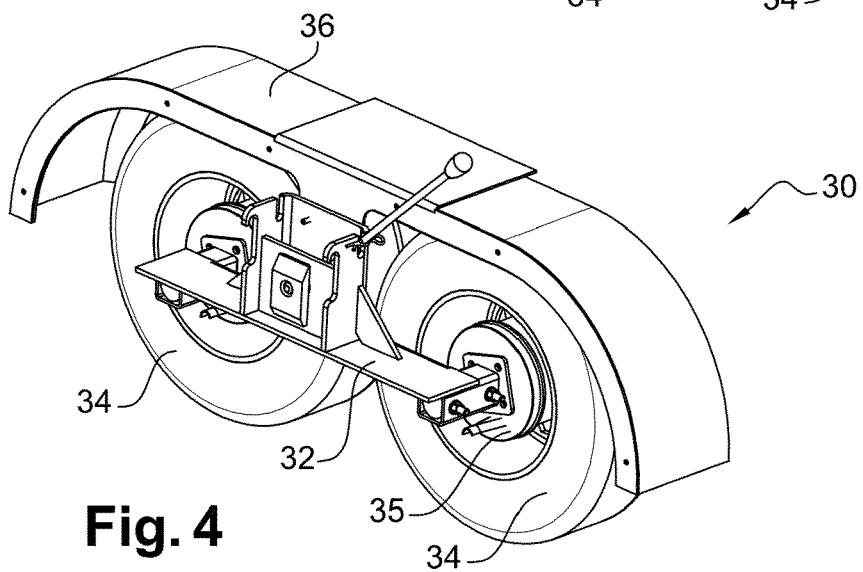

In reference to FIGS. 3 and 4, it is illustrated a wheeled carriage 30 of the trailer unit 10. Said wheeled carriage 30 comprises a wheel supporting member 32, a pair of wheels 34 pivotally connected thereto, and a mudguard 36 fixedly connected to the wheel supporting member 32 and extending above the wheels 34. When the wheeled carriage 30 is attached to the excavator 100, the wheels 32 are aligned in a rear-to-front direction. Each wheel 32 may advantageously be equipped with a drum brake 35.

Figure 5:
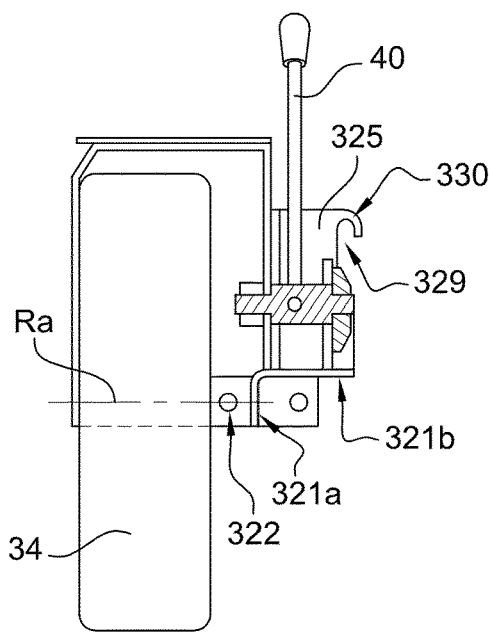
FIG. 5 is a cross-sectional front view of the wheeled carriage illustrated in FIG. 3.
Figure 7:
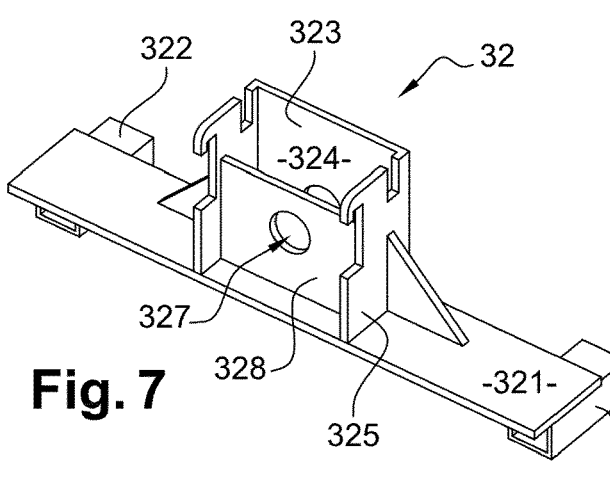
FIG. 7 is a perspective view of the wheel supporting member of the wheeled carriage illustrated in FIG. 3.

As illustrated in FIGS. 5 and 7, the wheel supporting member 32 comprises a L-shape profile 321 having a first flange 321a extending perpendicular to the rotation axes Ra of the wheels 34 and a second flange 321b extending perpendicular to the first flange 321a, a pair of tubular profiles 322 extending at both ends of the L-shape profile 321 and integral therewith, and a U-shape profile 323 extending perpendicular to the second flange 321b and integral therewith. Each tubular profile 322 is adapted to receive an axle defining the rotation axis Ra of a wheel 34, said axle being fixedly connected to the tubular profile 322 through bolts. The U-shape profile 323 comprises a bottom wall 324 and a pair of lateral walls 325 at both sides thereof. The bottom wall 324 comprises a circular cavity 326 that is aligned with a circular cavity 327 formed in an intermediate wall 328 that is parallel to the bottom wall 324 and integral with the lateral walls 325. The lateral walls 325 are provided at their internally oriented sides with C-shape cut-outs 329. The role of the circular cavities 326, 327 and of the C-shape cut-outs 329 is detailed in the following paragraphs.

Figure 5A:
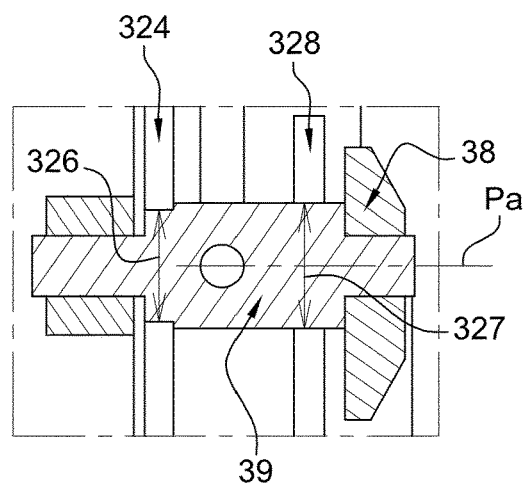
FIG. 5a is an enlarged view of a detail of FIG. 5.
Figure 6:
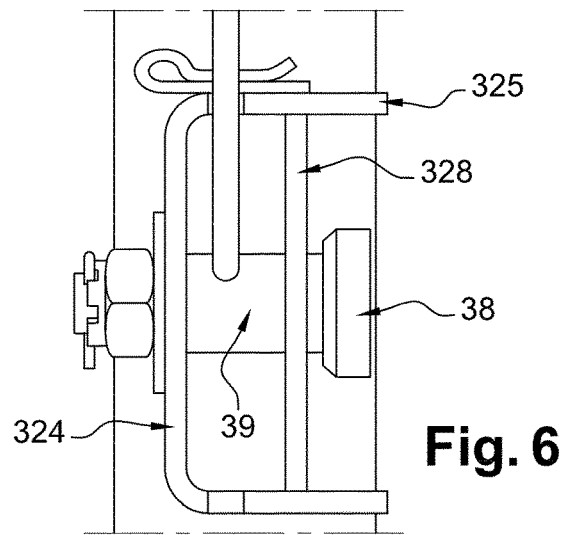
Figure 8:
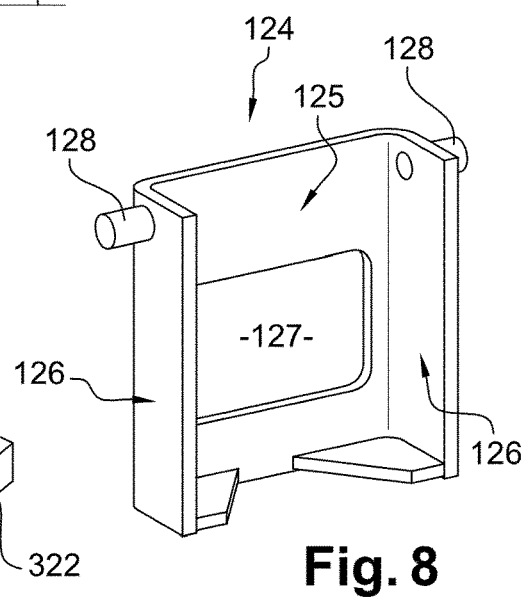
FIG. 8 is a perspective view of a connecting structure provided at each lateral side of the bottom frame illustrated in FIG. 2.

As illustrated in FIG. 2, each track frame 112 is provided with a U-shape connecting structure 124 protruding externally from the lateral sides thereof. As illustrated in FIG. 8, the connecting structure 124 comprises a bottom plate 125 and a pair of lateral flanges 126 at both sides thereof. Each lateral flange 126 is provided with a stud 128 protruding along a rear-to-front direction from the external side thereof. Said pair of protruding studs 128 is adapted to be received inside the C-shape cut-outs 329 and hooked by respective hook-shape top ends 330 of said C-shape cut-outs 329 when the wheel supporting member 32, and thus the wheeled carriage 30, is attached to a track frame 112. The bottom plate 125 comprises a rectangular aperture 127, said aperture 127 having advantageously the same shape as a locking plate 38 that is pivotally connected to the wheel supporting member 32. When the wheeled carriage 30 is attached to the track frame 112, the bottom plate 125 of the connecting structure 124 is positioned between the locking plate 38 and the intermediate wall 328 of the wheel supporting member 32. As illustrated in FIGS. 5, 5a and 6, the locking plate 38 may advantageously be fixedly connected to a pivot axle 39 defining a pivot axis Pa that is parallel to the rotation axes Ra of the wheels 34. The pivot axle 39 extends through the circular cavities 326, 327. A lever 40 fixedly connected to the pivot axle 39 permits to a user to pivotally move the locking plate 38 around the pivot axis Pa when the lever 40 is moved along a rear-to-front direction. The locking plate 38 can thus be moved between two specific positions, respectively an unlocking position, in which the locking plate 38 is aligned with the aperture 127, and a locking position, as illustrated in FIG. 6, in which the locking plate 38 is not aligned with the aperture 127. In the unlocking position, the locking plate 38 can thus go through the aperture 127, thus permitting the disconnection of the wheeled carriage 30 from the track frame 112. On the contrary, in the locking position, the locking plate 38 can not go through the aperture 127, thus preventing the disconnection of the wheeled carriage 30 from the track frame 112. The locking plate 38 may advantageously be locked in said locking position by a R-clip 41 that is introduced into a hole of the lever 40, said R-clip 41 abutting against a lateral wall 325 of the U-shape profile 323.

It is to be understood that the present invention is not limited to the embodiments described above and illustrated in the drawings; rather, the skilled person will recognize that many changes and modifications may be made within the scope of the appended claims.

The invention claimed is:

1. A trailer unit for use with a towing vehicle for transporting a tracked constructional machine having a left track frame and a right track frame, said trailer unit comprising:
   a pair of wheeled carriages, the pair of wheeled carriages includes a left wheeled carriage adapted to be detachably connected to the left track frame through a left connecting mechanism; and
   a right wheeled carriages, adapted to be detachably connected to the right track frame, through a right connecting mechanism;
   a drawbar having a first end adapted to be detachably connected to a rear frame of the towing vehicle and a second end adapted to be detachably connected to a bottom frame of the tracked constructional machine through a second connecting mechanism;
   wherein the left connecting mechanism comprises
      a left locking plate pivotally connected to the left wheeled carriage and movable between an unlocking position, in which the left locking plate passes through an aperture formed in the left track frame, and a locking position, in which the left locking plate cannot pass through said aperture;
   wherein the right connecting mechanism comprises
      a right locking plate pivotally connected to the right wheeled carriage, said right locking plate being movable between an unlocking position, in which the right locking plate passes through an aperture formed in right track frame, and a locking position, in which the right locking plate cannot pass through said aperture.

2. The trailer unit according to claim 1, wherein each of the left and right locking plates has a rectangular or substantially rectangular shape.

3. The trailer unit according to claim 1, wherein each of the left and right locking plates is fixedly connected to a pivot axle and each of, the left and right locking plates moving from its unlocking position to its locking position, or vice-versa, when a lever fixedly connected to the pivot axle is moved along a rear-to-front direction.

4. The trailer unit according to claim 1, wherein each of the left and right connecting mechanisms comprise a pair of hook-shaped elements adapted to hook a pair of protruding studs of the left and right track frames, respectively, when the left and right wheeled carriages are attached to the left and right track frames.

5. The trailer unit according to claim 1, wherein each wheeled carriage comprises a pair of wheels, the wheels being aligned in a rear-to-front direction.

6. The trailer unit according to claim 5, wherein each wheeled carriage comprises a mudguard extending above the wheels.

7. The trailer unit according to claim 1, wherein the second connecting mechanism comprise a pin adapted to be received in through-holes of the drawbar and corresponding through-holes of the bottom frame of the tracked constructional machine when the drawbar is attached to said bottom frame.

8. The trailer unit according to claim 7, wherein the second connecting mechanism comprise locking circlips connected at both ends of the pin, said locking circlips preventing the disconnection of the drawbar from the bottom frame.

9. The trailer unit according to claim 7, wherein the drawbar is adapted to be received in a central opening of a dozer blade of the tracked constructional machine when the drawbar is attached to the bottom frame.

10. A tracked constructional machine equipped with the trailer unit according to claim 1 and comprising a left track frame and a right track frame, each track frame being provided with an aperture and a pair of protruding studs.

11. The tracked constructional machine according to claim 10, further comprising a dozer blade provided with a central opening receiving the second end of the drawbar.

\* \* \* \* \*